3,317,583
ALKYLCARBAMATES OF CYANOSALICYL-
ANILIDES
Richard S. P. Hsi, Kalamazoo, Mich., assignor to The
Upjohn Company, Kalamazoo, Mich., a corporation of
Delaware
No Drawing. Filed Jan. 13, 1964, Ser. No. 337,160
3 Claims. (Cl. 260—465)

This invention relates to new and useful chemical compounds and more particularly to new alkylcarbamates of cyanosalicylanilides useful as anti-inflammatory as well as insecticidal agents, to the new intermediate cyanosalicylanilides, and to the process of production thereof.

The novel compounds of the present invention and the process of their production are illustratively represented by the following sequence of formulae:

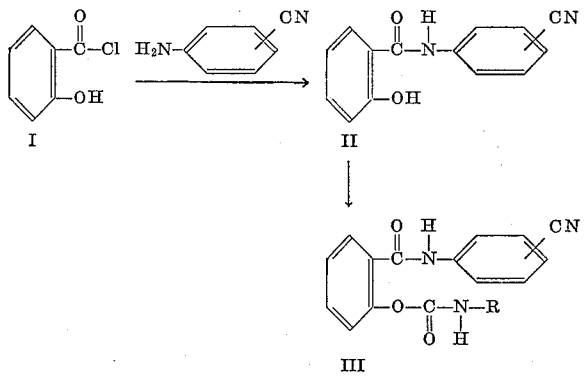

wherein R is a lower-alkyl having from 1 to 6 carbon atoms, inclusive.

Representative for radical R are methyl, ethyl, propyl, isopropyl, butyl, pentyl, hexyl, 2,2-dimethylbutyl, 2,3-dimethylbutyl, isopentyl and the like groups.

The novel compounds of this invention having Formula III have demonstrated anti-inflammatory activity as shown by the granuloma pouch tests in rats.

These compounds are therefore useful in the preparation of a wide variety of pharmaceutical compositions, particularly in unit dosage form, each unit containing a predetermined amount of the therapeutic compound of the present invention for oral, topical and parenteral administration. For oral administration compositions can be used in the form of tablets, pills, capsules, boluses, feed granules, elixirs, syrups and the like. For topical administration the compounds of Formula III can be used in the form of ointments, creams, lotions, sprays, solutions, suspensions or powders, while for parenteral administration sterile solutions and suspensions can be prepared in vehicles containing water, ethanol, glycerol, polyalkylene glycols, vegetable oils, and the like.

The compositions, in the appropriate form, can be administered orally and parenterally for systemic treatment, applied topically for local treatment, or administered parenterally for local treatment, such as injection into the joint cavity, tendon sheath and bursa.

The compositions provide the veterinarian with a method for treating inflammations in large and small animals, e.g., mammals, birds and fish. The mammals, birds and fish thus treated can be animals raised commercially for profit as well as animals kept for pets or include, but are not limited to, enteritis, rheumatoid and research. Inflammatory conditions which can be treated traumatic arthritis, osteoarthritis, tenosynovitis, bursitis and the like. Also, dermatitis of various origins can be treated.

The compounds also have insecticidal properties. For application as insecticides the compounds of Formula III are formulated into compositions adapted to insecticidal use.

The compounds of Formula III have further been shown to possess anti-viral (e.g., against Newcastle disease virus), cytotoxic, anti-bacterial (e.g., against *Bacillus subtilis, Mycobacterium phlei*), and anti-fungal (e.g., against *Nocardia asteroides, Trichophyton rubrum* and *violaceum Microsporum canis*, and *Blastomyces dermatitidis*) activities and can be used in suitable formulations against viral, fungal and bacterial infections. The cyanosalicylanilides of Formula II are useful as intermediates for the production of the compounds of Formula III.

The starting materials, salicyloyl chloride and o-, m-, and p-cyanoanilines are known compounds in the art.

In carrying out the process of this invention, salicyloyl chloride is reacted with a selected cyanoaniline in an anhydrous inert solvent. Useful inert solvents for this reaction include tetrahydrofuran, benzene, toluene, diethyl ether, diisopropyl ether, dioxane, and the like.

In the preferred emobdiment of this invention, a solution of salicyloyl chloride in the selected solvent, is added dropwise with stirring to a solution of the selected cyanoaniline. One molar equivalent of salicyloyl chloride is used with about 2 molar equivalents of cyanoaniline in the preferred embodiment of this reaction in tetrahydrofuran solution. Obviously, instead of 2 molar equivalents of cyanoaniline, 1 molar equivalent of cyanoaniline, 1 molar equivalent of another acid acceptor (e.g., triethylamine, pyridine, picolines, or the like), and 1 molar equivalent of salicyloyl chloride can be used. The temperature of the reaction is generally room temperature (about 23 to 26° C.); however, temperatures between about 0 to 50° C. or more are operative. The reaction is essentially completed within 1 to 24 hours after completition of addition of the reactants, when at room temperature. At lower or higher temperatures, the reaction time must be, of course, correspondingly adjusted. The products, cyanosalicylanilides, are generally isolated by conventional methods, e.g., by removing the solvent at reduced pressure. The thus-obtained crude material is purified by conventional procedures such as recrystallization.

The alkylcarbamates of the cyanosalicylanilides are obtained by reacting the cyanosalicylanilide in an inert organic solvent with a selected alkyl isocyanate. Inert solvents used in the reaction can be pyridine, diethyl ether, diisopropyl ether, dioxane, tetrahydrofuran, toluene, benzene or the like. In the preferred embodiment of this invention the reactants are mixed in equimolecular ratio or the alkyl isocyanates are used in slight excess (10 to 50%) above equimolecular proportion. Larger ratios or smaller ratios of cyanosalicylanilide and alkyl isocyanate are operative, but do not provide any advantages. The reaction proceeds at temperatures between about 15 and about 100° C. and can be accelerated by adding a small amount of a base such as triethylamine or using a basic solvent such as pyridine. The time of the reaction is between several hours to 1 week or more. At room temperature, usually from 12 hours to 4 days is required for the reaction to proceed to completion. The product is recovered by conventional means, such as filtration or concentration of the reaction mixture followed by filtration and the product is purified by washing and/or recrystallizing.

*Example 1.—4'-cyanosalicylanilide*

A solution containing 19 g. (0.12 mole) of salicyloyl chloride in 20 ml. of dry tetrahydrofuran was added dropwise with stirring to a solution containing 29.55 g. (0.25 mole) of p-cyanoaniline in 100 ml. of tetrahydrofuran. The mixture was stirred and kept at room temperature overnight (about 18 hours). The solvent was removed at reduced pressure and resulting residue washed with water. The water-insoluble crude product was recrystallized from 230 ml. of hot absolute ethanol to give 22.6 g. (79.0%) of 4'-cyanosalicylanilide having a melting point of 175–176.5° C.

*Analysis.*—Calcd. for $C_{14}H_{10}N_2O_2$: C, 70.58; H, 4.23; N, 11.76. Found: C, 70.35; H, 4.01; N, 11.50.

*Example 2.—2'-cyanosalicylanilide*

In the manner given in Example 1, a solution of salicyloyl chloride was reacted with o-cyanoaniline in tetrahydrofuran solution at room temperature. After removal of the solvent at reduced pressure a residue remained which was washed with water and the water-insoluble product recrystallized from hot ethanol to give 2'-cyanosalicylanilide.

*Example 3.—3'-cyanosalicylanilide*

A tetrahydrofuran solution was prepared containing equimolecular amounts of salicyloyl chloride, m-cyanoaniline and triethylamine. This mixture was stirred at room temperature overnight and the solvent removed at reduced pressure. The resulting residue was washed with water and recrystallized from absolute ethanol to give 3'-cyanosalicylanilide.

*Example 4.—Methylcarbamate of 4'-cyanosalicylanilide*

A solution of methyl isocyanate (51% in toluene, 11 ml. containing 0.066 mole of methyl isocyanate) was added to a warm solution of 4'-cyanosalicylanilide (11.91 g., 0.05 mole) in 70 ml. of dry tetrahydrofuran containing 5 drops of triethylamine. The mixture was kept at room temperature overnight for 18 hours and then diluted with absolute ether. A precipitate formed which was recovered by filtration. This precipitate was thereupon washed with ether, giving 12.6 g. (85.5%) of methylcarbamate of 4'-cyanosalicylanilide of melting point 163.5–164.5° C. and having the following analysis:

*Analysis.*—Calcd. for $C_{16}H_{13}N_3O_3$: C, 65.08; H, 4.44; N, 14.23. Found: C, 65.20; H, 4.68; N, 13.93.

*Example 5.—Ethylcarbamate of 4'-cyanosalicylanilide*

In the same manner given in Example 4, ethyl isocyanate and 4'-cyanosalicylanilide were reacted together in tetrahydrofuran in the presence of triethylamine. The mixture was stirred for a period of 20 hours, diluted with absolute ether and the resulting precipitate recovered by filtration and purified by washing with ether to give ethylcarbamate of 4'-cyanosalicylanilide.

*Example 6.—Butylcarbamate of 4'-cyanosalicylanilide*

A mixture of butyl isocyanate and 4'-cyanosalicylanilide in pyridine solution was stirred for 1 hour and then allowed to stand at room temperature for 60 hours. The solvent, pyridine, was removed thereupon at reduced pressure and the resulting residue was washed with ether and recrystallized from Skellysolve B hexanes and ether to give butylcarbamate of 4'-cyanosalicylanilide.

*Example 7.—Hexylcarbamate of 4'-cyanosalicylanilide*

In the manner given in Example 4, hexyl isocyanate in tetrahydrofuran-toluene solution was reacted with 4'-cyanosalicylanilide in the presence of triethylamine to give hexylcarbamate of 4'-cyanosalicylanilide.

*Example 8.—Methylcarbamate of 3'-cyanosalicylanilide*

In the manner given in Example 4, a toluene solution of methyl isocyaante was reacted with a tetrahydrofuran solution of 3'-cyanosalicylanilide in the presence of a small amount of triethylamine. The mixture was stirred for a period of 20 hours, ether was thereupon added and the precipitated product recovered by filtration. This product, after washing with ether, was methylcarbamate of 3'-cyanosalicylanilide in crystalline form.

*Example 9.—Isopropylcarbamate of 3'-cyanosalicylanilide*

In the manner given in Example 4, isopropyl isocyanate and 3'-cyanosalicylanilide in a solution of tetrahydrofuran and toluene containing a small amount of triethylamine were reacted at room temperature to give isopropylcarbamate of 3'-cyanosalicylanilide.

*Example 10.—Pentylcarbamate of 3'-cyanosalicylanilide*

In the manner given in Example 4, a pentyl isocyanate and 3'-cyanosalicylanilide in tetrahydrofuran solution were reacted at room temperature to give pentylcarbamate of 3'-cyanosalicylanilide.

*Example 11.—2,2-dimethylbutylcarbamate of 3'-cyanosalicylanilide*

In the manner given in Example 4, 2,2-dimethylbutyl isocyanate was reacted with 3'-cyanosalicylanilide in toluene at room temperature for a period of 20 hours to give 2,2-dimethylbutylcarbamate of 3'-cyanosalicylanilide.

*Example 12.—Methylcarbamate of 2'-cyanosalicylanilide*

In the manner given in Example 4, methyl isocyanate in toluene solution was reacted with 2'-cyanosalicylanilide in tetrahydrofuran in the presence of triethylamine to give methylcarbamate of 2'-cyanosalicylanilide.

*Example 13.—Ethylcarbamate of 2'-cyanosalicylanilide*

In the manner given in Example 4, ethyl isocyanate and 2'-cyanosalicylanilide in tetrahydrofuran in the presence of triethylamine was stirred for 20 hours to give ethylcarbamate of 2'-cyanosalicylanilide.

*Example 14.—Isobutylcarbamate of 2'-cyanosalicylanilide*

Isobutyl isocyanate and 2'-cyanosalicylanilide were reacted in benzene-tetrahydrofuran solution containing triethylamine to give isobutylcarbamate of 2'-cyanosalicylanilide.

*Example 15.—Isopentylcarbamate of 2'-cyanosalicylanilide*

In the manner given in Example 4, isopentyl isocyanate was reacted with 2'-cyanosalicylanilide in toluene-tetrahydrofuran solution to give isopentylcarbamate of 2'-cyanosalicylanilide.

*Example 16.—2,3-dimethylbutylcarbamate of 2'-cyanosalicylanilide*

In the manner given in Example 4, 2,3-dimethylbutyl isocyanate was reacted with 2'-cyanosalicylanilide in benzene solution at 30° C. for a period of 20 hours to give 2,3-dimethylbutylcarbamate of 2'-cyanosalicylanilide.

In the same manner given in Example 4, other alkylcarbamates of cyanosalicylanilides are prepared by reacting a selected cyanosalicylanilide with a selected alkyl isocyanate in the presence of a base, such as in pyridine solution, or in an inert solvent containing an organic base, such as triethylamine. Representative compounds thus obtained include the propylcarbamate, isopropylcarbamate, isobutylcarbamate, 2,2-dimethylbutylcarbamate, 2,3-dimethylbutylcarbamate, and 3-methylpentylcarbamate of 4'-cyanosalicylanilide; ethylcarbamate, propylcarbamate, isopentylcarbamate, and 2,3-dimethylbutylcarbamate of 3'-cyanosalicylanilide; propylcarbamate, isopropylcarbamate, hexylcarbamate, and 3-methylpentyl carbamate of 2'-cyanosalicylanilide, and the like.

I claim:
1. An alkylcarbamate of a cyanosalicylanilide having the formula:

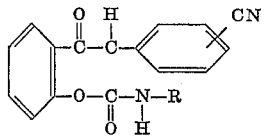

wherein R is a lower-alkyl having from 1 to 6 carbon atoms inclusive.

2. Methylcarbamate of 4'-cyanosalicylanilide.
3. Methylcarbamate of 2'-cyanosalicylanilide.

References Cited by the Examiner
UNITED STATES PATENTS

| | | | |
|---|---|---|---|
| 2,764,614 | 9/1956 | Merger | 260—480 |
| 3,091,633 | 5/1963 | Strube | 260—480 |

CHARLES B. PARKER, *Primary Examiner.*

J. P. BRUST, *Examiner.*

D. H. TORRENCE, *Assistant Examiner.*